(12) United States Patent
Sasagawa et al.

(10) Patent No.: US 8,111,875 B2
(45) Date of Patent: Feb. 7, 2012

(54) METHOD OF AND APPARATUS FOR TAKING SOLID IMAGE AND COMPUTER PROGRAM FOR CAUSING COMPUTER TO EXECUTE THE METHOD

(75) Inventors: Mikio Sasagawa, Asaka (JP); Norihisa Sutoh, Asaka (JP); Youichi Sawachi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1009 days.

(21) Appl. No.: 12/033,595

(22) Filed: Feb. 19, 2008

(65) Prior Publication Data

US 2008/0199046 A1 Aug. 21, 2008

(30) Foreign Application Priority Data

Feb. 20, 2007 (JP) ................................. 2007-038816

(51) Int. Cl.
*G06K 9/00* (2006.01)
*G06K 9/62* (2006.01)

(52) U.S. Cl. ...................................... 382/106; 382/224

(58) Field of Classification Search .................. 382/106, 382/154, 224, 284; 345/619, 629
See application file for complete search history.

(56) References Cited

U.S. PATENT DOCUMENTS

| 5,463,730 | A  | * | 10/1995 | Hatada ........................... 715/810 |
| 5,510,831 | A  | * | 4/1996  | Mayhew .......................... 348/47 |
| 5,745,101 | A  | * | 4/1998  | Yamamoto et al. ........... 345/573 |
| 7,106,376 | B1 | * | 9/2006  | Anderson ..................... 348/345 |
| 7,187,389 | B2 | * | 3/2007  | Redpath et al. ............... 345/619 |
| 7,567,704 | B2 | * | 7/2009  | Au et al. ....................... 382/154 |
| 7,620,906 | B2 | * | 11/2009 | Igeta ............................. 715/769 |
| 7,667,735 | B2 | * | 2/2010  | Ikeyama .................. 348/208.12 |

FOREIGN PATENT DOCUMENTS

| JP | 10-170227   | A | 6/1998 |
| JP | 2003-209858 | A | 7/2003 |
| JP | 2003-264851 | A | 9/2003 |
| JP | 2004-312537 | A | 11/2004 |

* cited by examiner

*Primary Examiner* — Daniel Mariam
(74) *Attorney, Agent, or Firm* — Birch, Stewart, Kolasch & Birch, LLP

(57) ABSTRACT

A solid image taking apparatus includes a plurality of image taking portions which obtain a plurality of images at each sight point by taking a plurality of images of objects from different sight points, a distance measuring portion which measures object distances which are distances to the objects from the plurality of image taking portions, and a classifying portion which classifies the objects included in the images into a plurality of groups according to the object distances and outputs the result of classification.

5 Claims, 18 Drawing Sheets

METHOD OF AND APPARATUS FOR TAKING SOLID IMAGE AND COMPUTER PROGRAM FOR CAUSING COMPUTER TO EXECUTE THE METHOD

BACKGROUND OF THE INVENTION

1. Field of the Invention

This invention relates to a method of and an apparatus for taking an image from a plurality of different sight points to take a solid image and computer program for causing a computer to execute the method.

2. Description of the Related Art

There has been known that by displaying a plurality of images in combination, an image represented by the plurality of images can be stereoscopically viewed on the basis of the parallax. The image which can be stereoscopically viewed can be made by obtaining a plurality of images by taking an image of an object from different positions by each of a plurality of cameras and by combining a plurality of images on the basis of parallax of the object included in the plurality of images. (For instance, see Japanese Unexamined Patent Publication Nos. 10(1998)-170227, 2003-209858 and 2003-264851). Specifically, the solid image can be made by making colors of a plurality of images different from each other, e.g., one being in red and the other being in blue, and overlapping them or combining the plurality of images line by line. The image can be stereoscopically viewed by displaying the solid image and fusing the solid image by auto focus function of the eyes by the use of red and blue grasses or polarized glasses. Further, the solid image can be stereoscopically viewed by displaying the solid image on a monitor without use of polarized glasses or the like.

However, when the distance to the object is too small, the parallax is difficult to fuse due to a too large distance between the images of the object on the solid image and the effort of forcing to fuse results in much feeling of fatigue in eyes. The reason why the parallax is difficult to fuse in such a solid image is in that the distance to the object cannot be checked when the images for making the solid image were taken.

SUMMARY OF THE INVENTION

In view of the foregoing observations and description, the primary object of this invention is to check the distance to the object upon making the solid image.

In accordance with the present invention, there is provided a solid image taking apparatus comprising a plurality of image taking means which obtain a plurality of images at each sight point by taking a plurality of images of objects from different sight points, a distance measuring means which measures object distances which are distances to the objects from the plurality of image taking means, and a classifying means which classifies the objects included in the images into a plurality of groups according to the object distances and outputs the result of classification.

The solid image taking apparatus of the present invention may further comprise a display means which displays the plurality of images and/or a solid image made from the plurality of images and a display form changing means which changes the display form of the object included in the plurality of images and/or the solid image according to the result of classification.

Further, the display form changing means may comprise a means for masking the area at a predetermined object distance included in the plurality of images and/or the solid image.

Further, the display form changing means may comprise a means for substituting an image in a corresponding area included in one of the plurality of images for the area at a predetermined object distance included in the solid image.

Further, the solid image taking apparatus of the present invention may further comprise a means for calculating a proportion of the area occupied by the object at a predetermined object distance included in the solid image to the plurality of images and/or the solid image according to the result of classification and making an alarm when it is not smaller than a predetermined value.

Further, the solid image taking apparatus of the present invention may further comprise a means for calculating a proportion of the area occupied by the object at a predetermined object distance included in the solid image to the plurality of images and/or the solid image according to the result of classification and adjusting at least one of the angle of vergence, base length and the zooming magnification when the proportion is not smaller than a predetermined value.

In accordance with the present invention, there is further provided a solid image taking method comprising the steps of obtaining a plurality of images at each sight point by taking a plurality of images of objects from different sight points with a plurality of image taking means which measuring object distances which are distances to the objects from the plurality of image taking means, and classifying the objects included in the images into a plurality of groups according to the object distances and outputting the result of classification.

A computer-readable medium in which a computer program which causes a computer to execute the solid image taking method of the present invention is recorded may be provided. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In accordance with the present invention, the object distances which are distances to the objects from the plurality of image taking means are measured, the objects included in the images are classified into a plurality of groups according to the object distances and the result of classification is output. Accordingly, the object distances of the objects included in the images obtained by the image takings can be known by referring to the result of classification. As a result, in the case where an object is included in the images obtained by the image takings at an undesirable object distance, adjustment such as changing the display form, making an alarm or adjusting the angle of vergence of the image taking means can be made on the area of the image at the undesirable object distance. Accordingly, when such processing is executed, images at object distances which make a parallax suitable to the stereoscopic viewing are only obtained, whereby a solid image free from feeling of fatigue can be made.

Further, by changing the display form of the object included in the plurality of images and/or the solid image, the object distance can be more easily recognized.

In this case, by masking an area including an object at a predetermined object distance in the plurality of images and/or the solid image, the area at the predetermined object distance cannot be stereoscopically viewed in the solid image. Accordingly, by employing a very small distance where the parallax is difficult to fuse as the predetermined object distance, the object at a very small distance cannot be stereoscopically viewed, whereby a solid image free from feeling of fatigue can be made.

Further, by substituting an image in a corresponding area included in one of the plurality of images for the area at a predetermined object distance included in the solid image, the area at the predetermined object distance cannot be stereoscopically viewed in the solid image. Accordingly, by employing a very small distance where the parallax is difficult to fuse as the predetermined object distance, the object at a very small distance cannot be stereoscopically viewed, whereby a solid image free from feeling of fatigue can be made.

Further, by calculating a proportion of the area occupied by the object at a predetermined object distance included in the solid image to the plurality of images and/or the solid image according to the result of classification and making an alarm when it is not smaller than a predetermined value, the photographer can easily know that an object at an undesirable object distance is included in the images obtained by the image takings.

Further, by calculating a proportion of the area occupied by the object at a predetermined object distance included in the solid image to the plurality of images and/or the solid image according to the result of classification and adjusting at least one of the angle of vergence, base length and the zooming magnification when the proportion is not smaller than a predetermined value, a solid image free from feeling of fatigue can be made.

PREFERRED EMBODIMENT OF THE INVENTION

Figure 1:
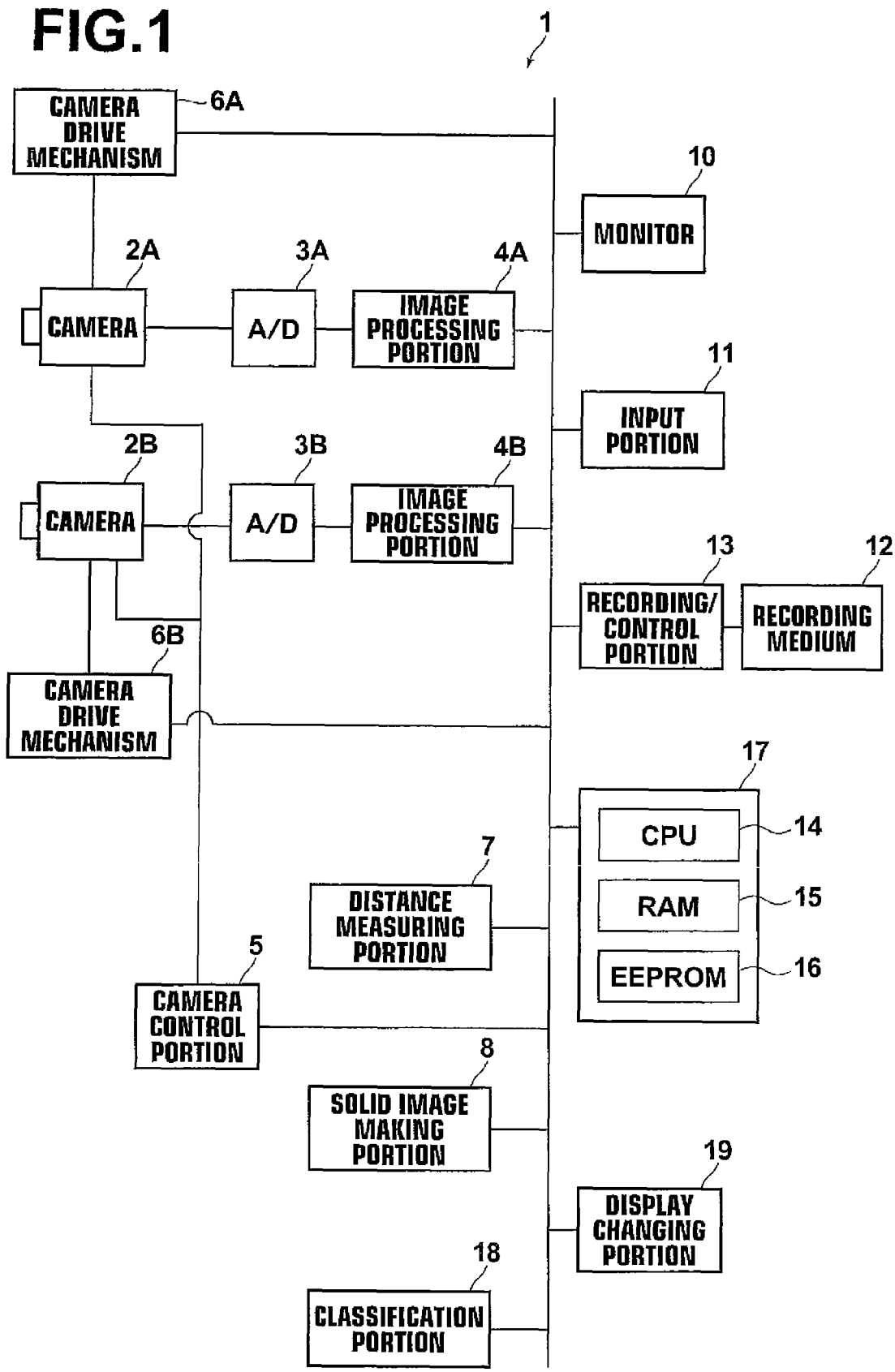
FIG. 1 is a block diagram showing a solid image taking apparatus in accordance with a first embodiment of the present invention.

Embodiments of a solid image taking apparatus of the present invention will be described with reference to the drawings, hereinbelow. FIG. 1 is a block diagram showing a solid image taking apparatus in accordance with a first embodiment of the present invention. As shown in FIG. 1, the solid image taking system 1 in accordance with the first embodiment of the present invention comprises a pair of cameras 2A and 2B, a pair of A/D converting portions 3A and 3B, and a pair of image processing portions 4A and 4B, a camera control portion 5 and camera drive mechanisms 6A and 6B.

The cameras 2A and 2B are provided with image taking devices such as those comprising a taking lens, a CCD and the like and the focusing and the zooming by the use of the taking lenses and the timing of read-out of the electric charges from the image taking devices are controlled by the camera control portion 5. Further, the cameras 2A and 2B are spaced from each other at a predetermined space and the base length and the angle of vergence of the cameras 2A and 2B (the space between the cameras 2A and 2B) can be varied by the camera drive mechanisms 6A and 6B. Though the cameras 2A and 2B are for taking animation in the first embodiment, they may be for taking a still image.

The A/D converting portions 3A and 3B convert the images SA and SB obtained by the cameras 2A and 2B from analog data to digital data.

The image processing portions 4A and 4B carry out image processing such as gradation processing, color converting processing and the like on the images SA and SB after the A/D conversion.

The camera drive mechanisms 6A and 6B are of known structure driven by a stepping motor or the like to change the angle of vergence and the base length of the cameras. When change of the angle of vergence and the base length is instructed through an input portion 11 to be described later, the motor is driven to change the angle of vergence and the base length of the cameras 2A and 2B according to the instructed amounted change.

The solid image taking system 1 further comprises a distance measuring portion 7 and a solid image making portion 8.

The distance measuring portion 7 is for measuring the distance to the objects included in the photographing range of each camera 2A or 2B from each camera 2A or 2B, and first obtain corresponding points corresponding to each other on the images SA and SB obtained by the cameras 2A and 2B by the use of the stereo matching. For example, the corresponding points are obtained by taking out a fractional matrix (e.g., 3 pixels×3 pixels) from the images SA and SB and obtaining the correlation values thereof. Then the distances (object distances) to objects included in the images SA and SB are calculated on the basis of the trigonometry by the use of the obtained corresponding points, the base length, the angle of vergence and the zooming magnification of the cameras 2A and 2B. Specifically, the object distances are calculated by a pixel for all the pixels on the images SA and SB.

The solid image making portion 8 makes a solid image SR by thinning in the vertical direction the images SA and SB one line by one line and alternately arranging the thinned images SA and SB one line by one line.

The solid image taking system 1 is further provided with a monitor 10 comprising a liquid crystal for displaying the images SA and SB and the solid image SR, the input portion 11 comprising keyboard or the like for inputting various things into the solid image taking system 1 and a recording control portion 13 for recording the solid image SR on a recording medium 12 such as of a memory card. Further, the solid image taking system 1 is provided with an overall control portion 17 comprising a CPU (central processor unit) 14, a RAM (random access memory) 15 for storing the control program and at the same time, for making the working area, and an EEPROM (electrically erasable and programmable read only memory) 16 for storing various setting values.

The solid image taking system 1 is further provided with a classifying portion 18 which classifies the objects included in the solid image SR into a plurality of groups according to the object distances and a display changing portion 19 which changes the form of the display of the solid image SR according to the result of classification by the classifying portion 18.

Figures 2A, 2B, 2C:
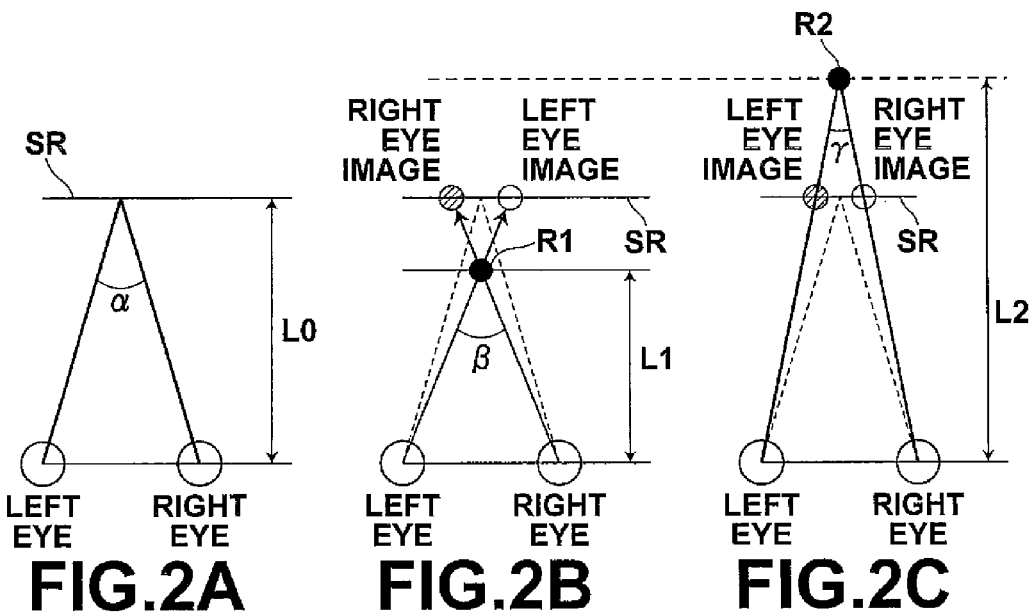
FIGS. 2A to 2C are views for description of the parallax.

The parallax when the stereoscopic viewing is conducted will be described, hereinbelow. FIGS. 2A to 2C are views for description of the parallax. As shown in FIG. 2A, the distance to the solid image SR from the eyes when the solid image SR is viewed in the state where the stereoscopic viewing is not conducted is taken as a distance L0 of adjustment. The parallax in this case is at angle α. In the solid image SR, the objects near to the cameras 2A and 2B increase in parallax, and the image for the left eye (left eye image) and the image for the right eye (right eye image) for an object are reversed in position where they are to be positioned. Accordingly, when the left and right eyes are crossed before the solid image SR as shown in FIG. 2B, a solid image R1 can be viewed before the solid image SR. The distance to the solid image R1 from the eyes in this case is taken as the distance L1 of vergence. The parallax in this case is at angle β.

On the other hand, in the solid image SR, the objects fur from the cameras 2A and 2B decrease in parallax, and the image for the left eye (left eye image) and the image for the right eye (right eye image) for an object are not reversed in position where they are to be positioned. Accordingly, when the left and right eyes are crossed behind the solid image SR as shown in FIG. 2C, a solid image R2 can be viewed behind the solid image SR. The distance to the solid image R2 from the eyes in this case is taken as the distance L2 of vergence. The parallax in this case is at angle γ.

By viewing the solid image SR in this way, the solid image SR is given the feeling of depth by the difference between the distances L1 and L2 of vergence.

Since in the objects fur from the cameras 2A and 2B, parallax are small as shown in FIG. 2C, the feeling of fatigue is small. On the other hand, in the objects near to the cameras 2A and 2B, since parallax are large as shown in FIG. 2B, and it is necessary to largely cross the left and right eyes, the feeling of fatigue is large. When the absolute value of the difference between the angles α and β is not larger than 1 degree, that is, $|\alpha-\beta|\leq 1$, the stereoscopic viewing can be conducted with a relatively small feeling of fatigue.

The classifying portion 18 classifies the objects included in the images SA and SB into 3 groups on the basis of the object distance for each pixel of the images SA and SB calculated by the distance calculating portion 7. Specifically, the objects, that is, pixels in the images, are classified into a first group G1 having a suitable object distance where the parallax meets the relation $|\alpha-\beta|\leq 1$, a second group G2 where the object distance is fur to cause the parallax to be smaller than α, and a third group 63 having an unsuitable object distance where the parallax does not meet the relation $|\alpha-\beta|\leq 1$.

Figures 3A, 3B:
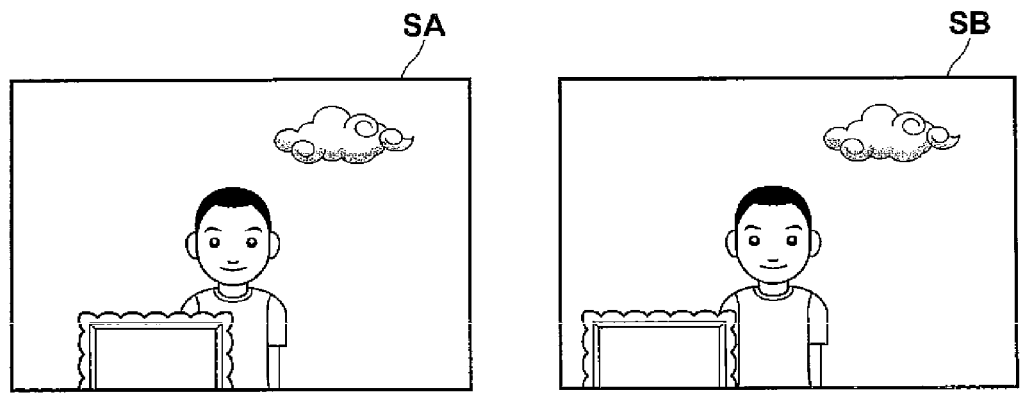
FIGS. 3A and 3B are views for description of the classification.

FIGS. 3A and 3B are views for description of the classification. For the purpose of simplicity, it is supposed that the images SA and SB have as objects a sky which makes a background, a figure and a billboard in front of the figure. In this case, pixels included in the area of the figure are classified into the first group G1, pixels included in the area of the sky are classified into the second group S2, and pixels included in the area of the billboard are classified into the third group G3.

Figure 4:
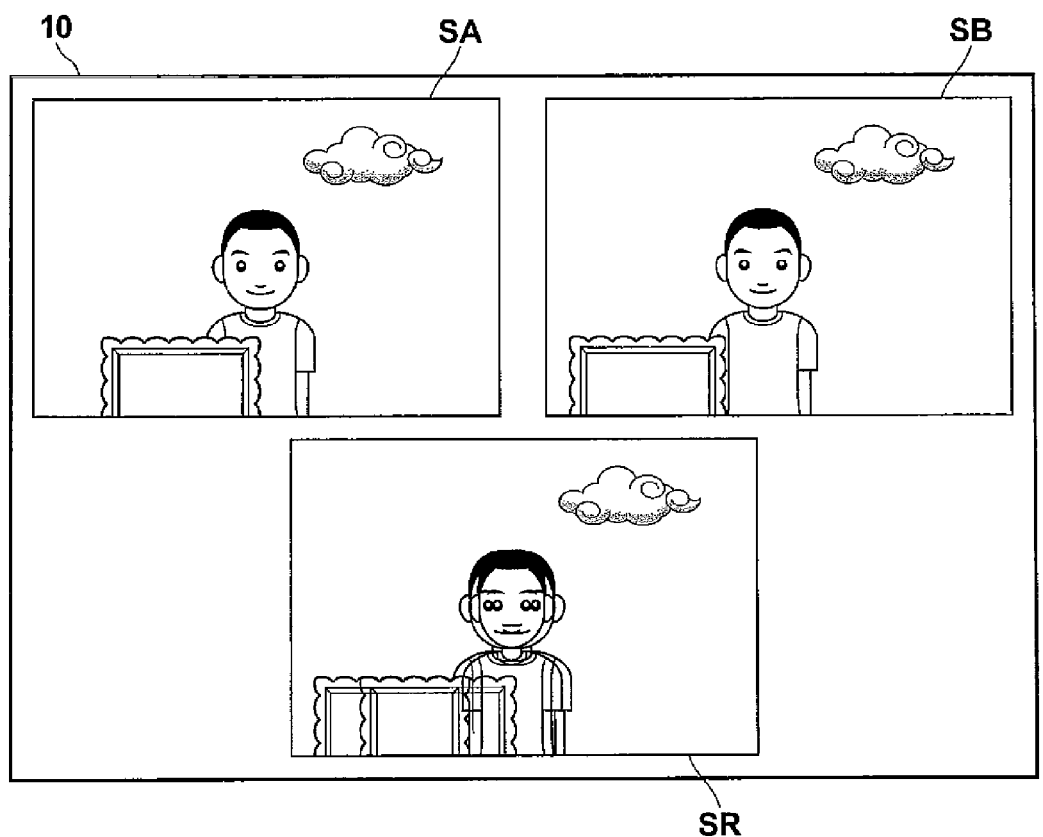
FIG. 4 is a view showing an example of display on the monitor.
Figure 5:
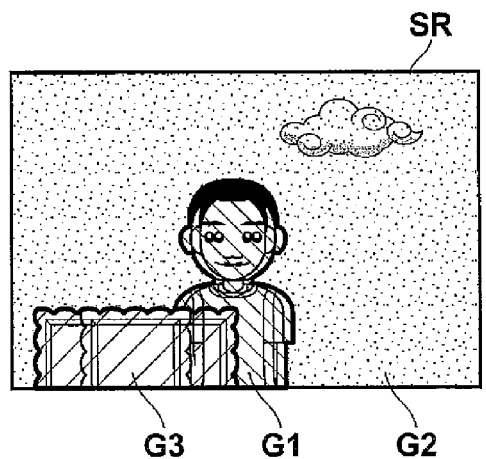
FIG. 5 shows a colored solid image.

The display changing portion 19 displays pixels on the monitor 10 in different colors according to the result of classification by the classifying portion 18. FIG. 4 is a view showing an example of display on the monitor 10. As shown in FIG. 4, though the images SA and SB and the solid image SR are simultaneously displayed on the monitor 10 in this embodiment, the pixels of the solid image SR are colored in different colors by the classification as shown in FIG. 5. Specifically, pixels in different groups are colored in different colors, by overlapping color different by the group on the color of each pixel. In FIG. 5, the difference in colors among the groups G1 to G3 is represented by different hatchings.

Not only the colors, the transparency of the images may be changed by the groups. For example, the group G1 may have a transparency 0 (not transparent at all) while the group G2 is 0.5 in transparency (half transparent) and the group G3 is 0.1 in transparency (almost transparent).

Figure 6:
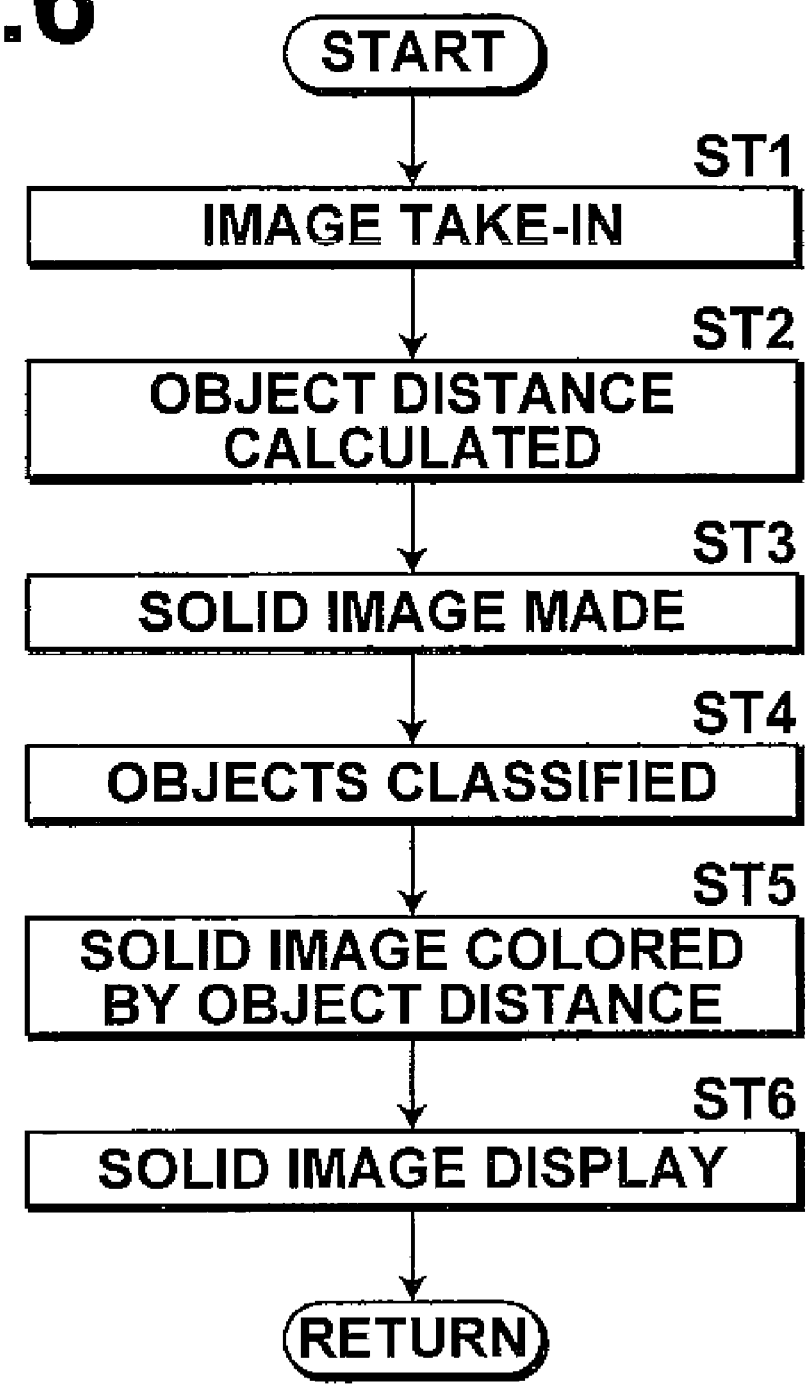
FIG. 6 is a flowchart showing processing executed in the first embodiment.

Processing to be done in the first embodiment will be described hereinbelow. FIG. 6 is a flowchart showing processing executed in the first embodiment. When the power source of the solid image taking system 1 is turned on, the overall control portion 17 is started processing, and takes in the RAM 15 images SA and SB which have been obtained by the cameras 2A and 2B through photographing and have been subjected to the A/D conversion and the image processing (step ST1). Then the distance calculating portion 7 calculates the object distances of the objects included in the images SA and SB (step ST2) and the solid image making portion 8 makes a solid image (step ST3).

Then the classifying portion 18 classifies the objects included in the images SA and SE into the three groups on the basis of the object distances by pixels included in the images SA and SB calculated by the distance calculating portion 7. (step ST4) Thereafter, the display changing portion 19 colors the solid image SR according to the result of the classification (step ST5), the colored solid image SR is displayed on the monitor 10 together with the images SA and SB (step ST6), and then processing is returned to step ST1.

Since the objects included in the solid image SR are colored and displayed according to the result of classification where the objects are classified according to the object distances in the first embodiment, the object distance of object to be photographed can be easily recognized by observing the displayed solid image SR. Accordingly, whether there is included an object at an undesirable object distances in the photographed images SA and SB can be easily determined, and when there is included an object at an undesirable object distances in the photographed images SA and SB, the angle of vergence and the base length of the cameras 2A and 2B can be adjusted. As a result, an image solely including objects at desirable object distances can be obtained and a solid image SR free from the feeling of fatigue can be made.

Though, the solid image SR is colored in different colors according to the object distances in the first embodiment, the images SA and SB may be colored in different colors or both the solid image SR and the images SA and SB may be colored in different colors.

A second embodiment of the present invention will be described, hereinbelow. Since the solid image taking system in accordance with the second embodiment of the present invention is the same as that of the first embodiment in the structure and differs therefrom only in the processing to be executed by the display changing portion 19, the detailed description of the structure is abbreviated, here. Though in the solid image SR is colored in different colors according to the object distances in the first embodiment, a predetermined area including pixels classified into the group G3 is masked in the second embodiment.

Figure 7:
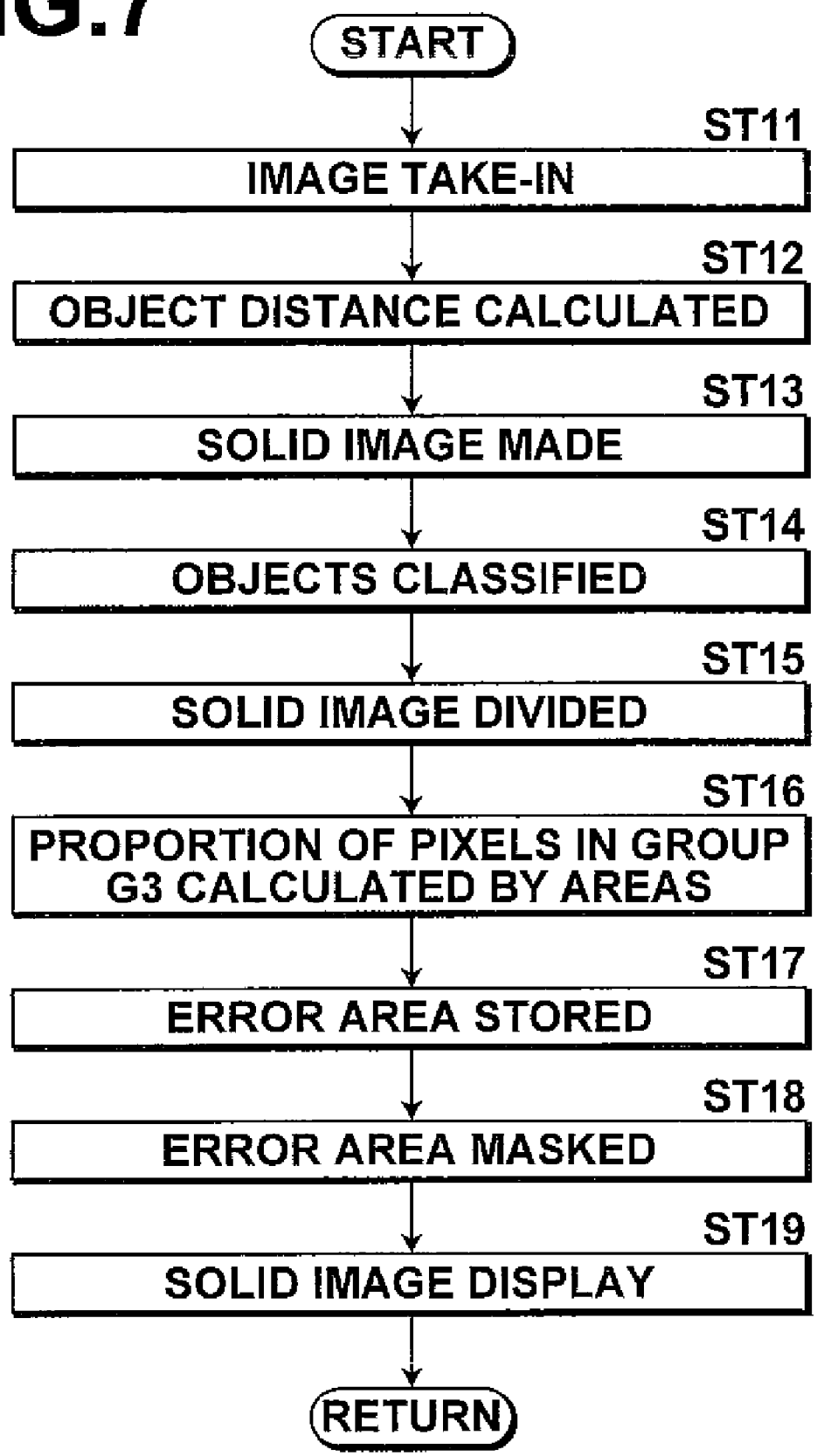
FIG. 7 is a flowchart showing processing executed in the second embodiment.

FIG. 7 is a flowchart showing processing executed in the second embodiment. When the power source of the solid image taking system 1 is turned on, the overall control portion 17 is started processing, and takes in the RAM 15 images SA and SB which have been obtained by the cameras 2A and 2B through photographing and have been subjected to the A/D conversion and the image processing. (step ST11) Then the distance calculating portion 7 calculates the object distances of the objects included in the images SA and SB (step ST12) and the solid image making portion 8 makes a solid image (step ST13).

Then the classifying portion 18 classifies the objects included in the images SA and SB into the three groups on the basis of the object distances by pixels included in the images SA and SB calculated by the distance calculating portion 7. (step ST14) Thereafter, the display changing portion 19 divides the solid image SR into a predetermined number (e.g., 8) of areas (step ST15), and the proportion of pixels to be classified into the group G3 is calculated in each of the areas (step ST16). Then the areas (will be referred to as "error area", hereinbelow) where the calculated proportion is not smaller than a threshold value (e.g., 30%) are stored in the RAM 15 (step ST17) and the error areas on the solid image are masked (step ST18). The masked solid image SR is displayed on the monitor 10 together with the images SA and SB (step ST19), and then processing is returned to step ST11.

Figure 8:
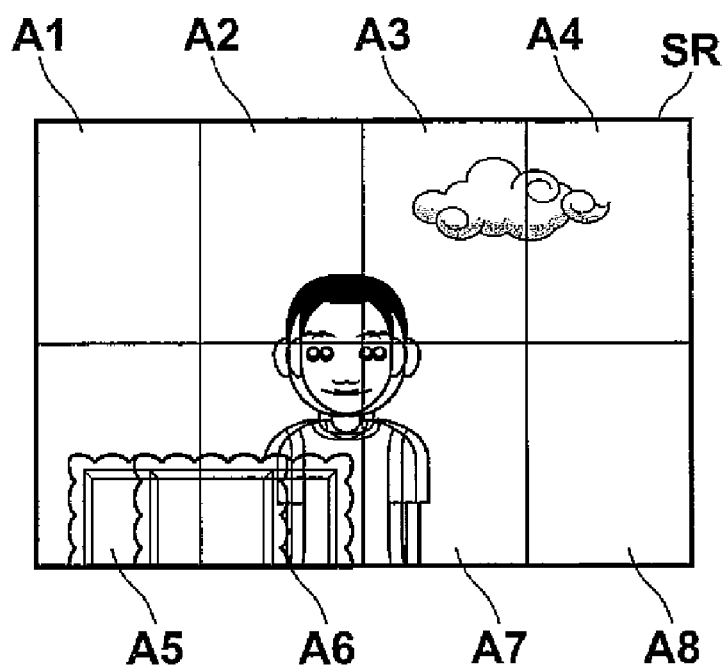
FIG. 8 is a view for description of an example of the masking.
Figure 9:
FIG. 9 is a view for description of another example of the masking.

FIG. 8 is a view for description of an example of the masking. As shown in FIG. 8, when it is assumed that the solid image SR is divided into 8 areas A1 to A8, pixels classified into the group G3 are included in areas A5 and A6 and their proportions to all the pixels in the areas A5 and A6 are not smaller than 30%. Accordingly, the areas A5 and A6 are masked as shown in FIG. 9 and the solid image SR is displayed on the monitor 10 together with the images SA and SB. The masking may be done by coloring the area to be masked in grays. In FIG. 9, the area to be masked is colored in black.

Since in the second embodiment, the area including the object at the object distance of the group G3 on the solid image SR is masked in this manner, the area at the object distance which would provide the feeling of fatigue on the solid image SR cannot be stereoscopically viewed. Accordingly, a solid image SR free from the feeling of fatigue can be made.

Though the areas A5 and A6 are masked in the second embodiment, only the area comprising pixels classified into the group G3 may be masked.

A third embodiment of the present invention will be described, hereinbelow. Since the solid image taking system in accordance with the third embodiment of the present invention is the same as that of the first embodiment in the structure and differs therefrom only in the processing to be executed by the display changing portion 19, the detailed description of the structure is abbreviated, here. Though the solid image SR is colored in different colors according to the object distances in the first embodiment, a predetermined area including pixels classified into the group G3 in the solids image is substituted for the corresponding area in the image SA or SB in the third embodiment.

Figure 10:
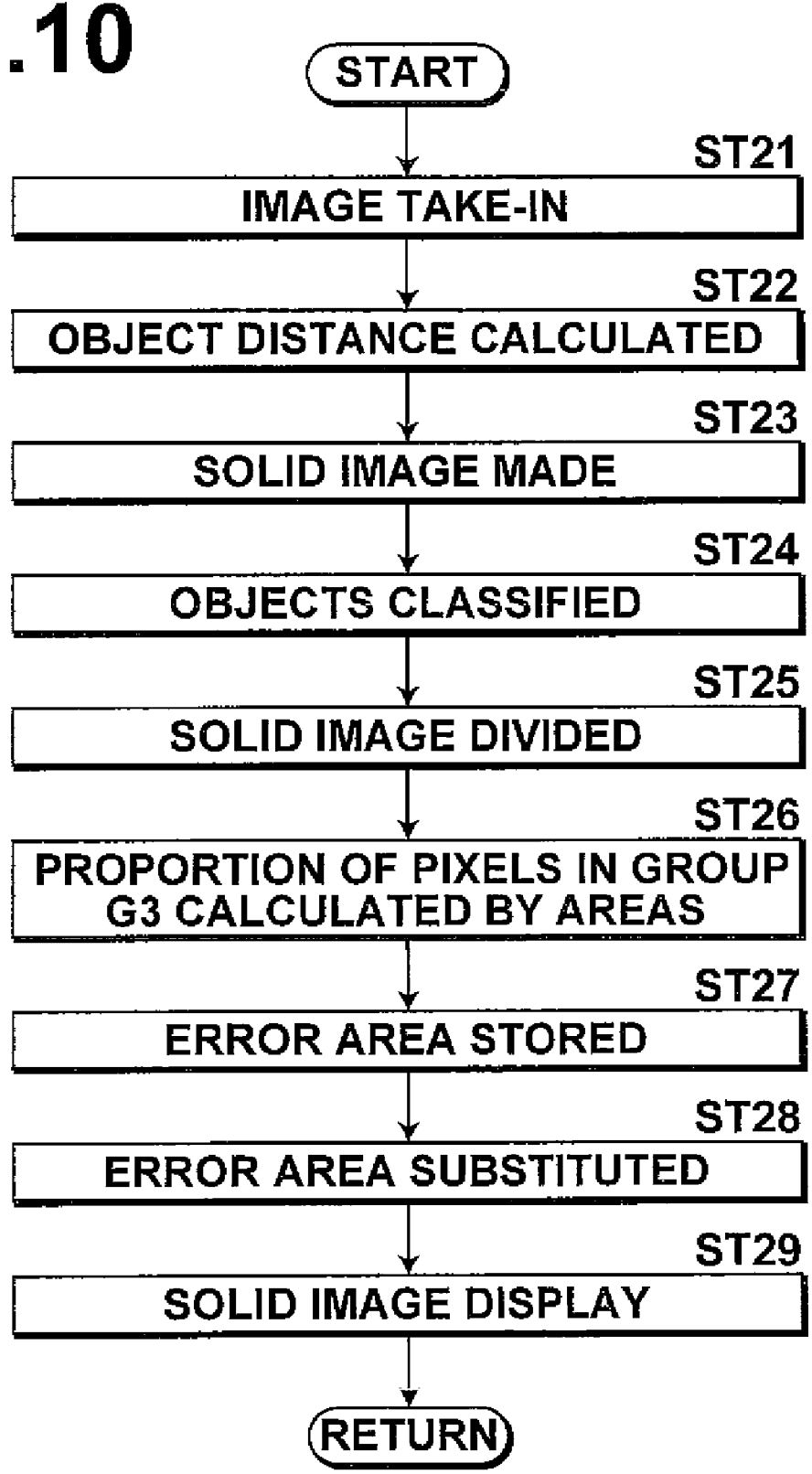
FIG. 10 is a flowchart showing processing executed in the third embodiment.

FIG. 10 is a flowchart showing processing executed in the third embodiment. When the power source of the solid image taking system 1 is turned on, the overall control portion 17 is started processing, and takes in the RAM 15 images SA and SB which have been obtained by the cameras 2A and 2B through photographing and have been subjected to the A/D conversion and the image processing. (step ST21) Then the distance calculating portion 7 calculates the object distances of the objects included in the images SA and SB (step ST22) and the solid image making portion 8 makes a solid image (step ST23).

Then the classifying portion 18 classifies the objects included in the images SA and SB into the three groups on the basis of the object distances by pixels included in the images SA and SB calculated by the distance calculating portion 7. (step ST24) Thereafter, the display changing portion 19 divides the solid image SR into a predetermined number (e.g., 8) of areas (step ST25), and the proportion of pixels to be classified into the group G3 is calculated in each of the areas (step ST26). Then the error areas where the calculated proportion is not smaller than a threshold value (e.g., 30%) are stored in the RA 15 (step ST27) and the error areas on the solid image are substituted for the corresponding areas on the image SA or SB (step ST28). The solid image SR substituted for with the error areas is displayed on the monitor 10 together with the images SA and SB (step ST29), and then processing is returned to step ST21.

Figure 11:
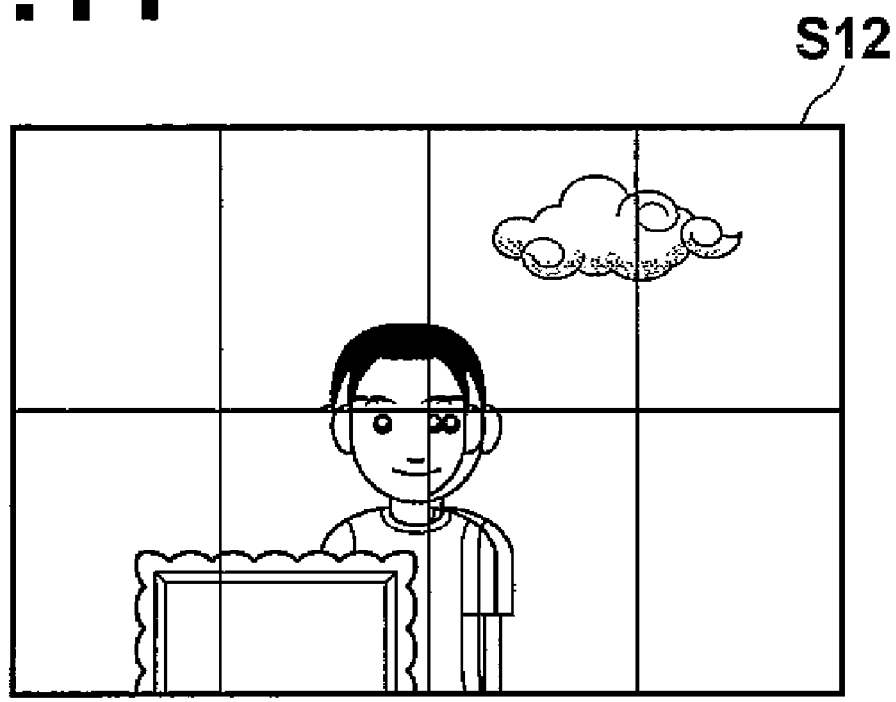
FIG. 11 is a view for description of the substitution of the image.

When it is assumed here that the solid image SR is divided into 8 areas A1 to A8 as shown in FIG. 8, pixels classified into the group G3 are included in areas A5 and A6 and their proportions are not smaller than 30%. Accordingly, in the third embodiment, only the areas A5 and A6 are substituted for the corresponding area in the image SA as shown in FIG. 11 and are displayed on the monitor 10.

Since in the third embodiment, only the area including the object at the object distance of the group G3 on the solid image SR is substituted for the corresponding area in the image SA or SB in this manner, the area at the object distance which would provide the feeling of fatigue on the solid image SR cannot be stereoscopically viewed. Accordingly, a solid image SR free from the feeling of fatigue can be made.

Though the areas A5 and A6 are substituted for the image SA in the third embodiment, only the area comprising pixels classified into the group G3 may be substituted for the image SA.

Figure 12:
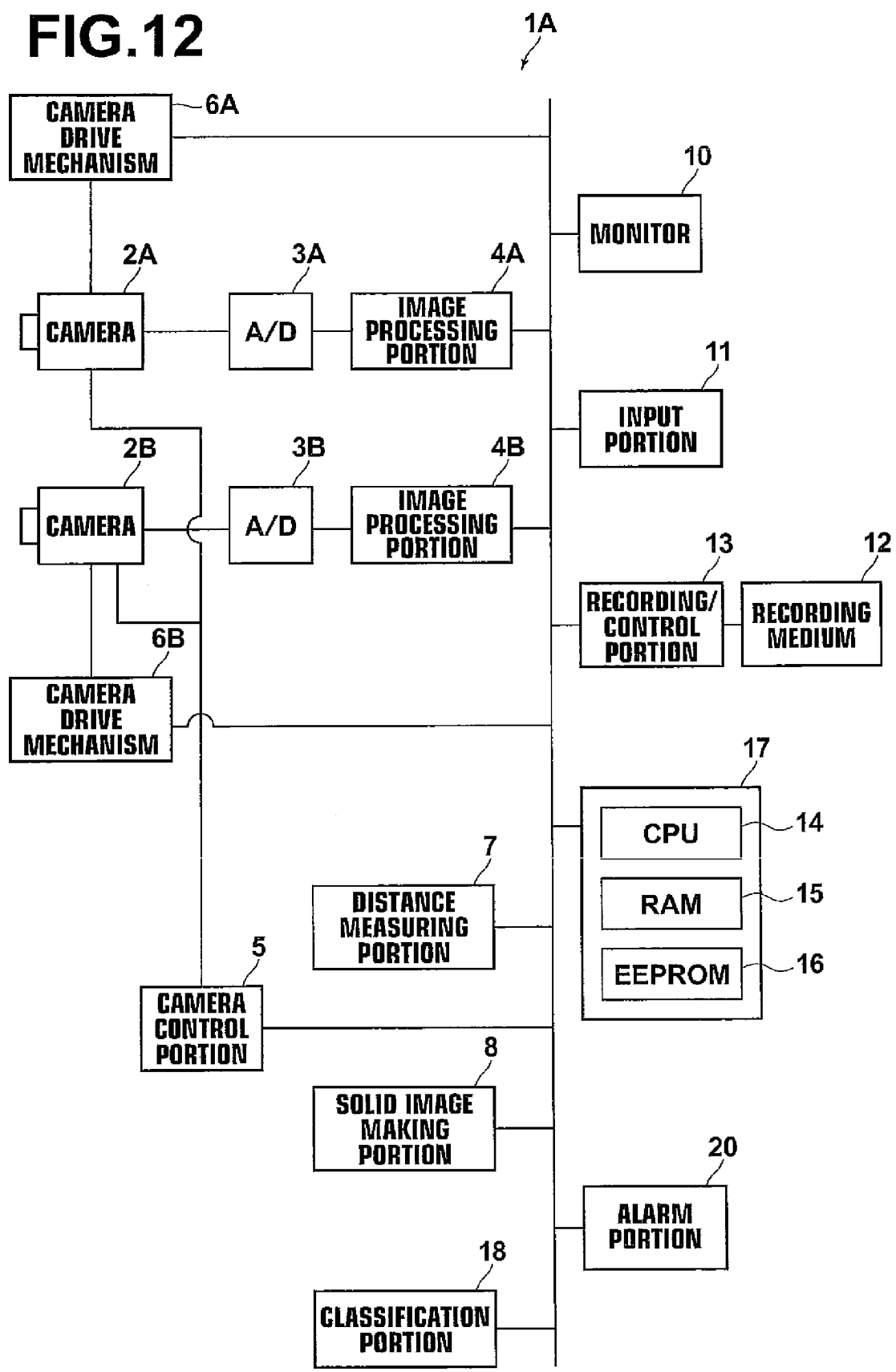
FIG. 12 is a block diagram showing a solid image taking apparatus in accordance with a fourth embodiment of the present invention.

A fourth embodiment of the present invention will be described, hereinbelow. FIG. 12 is a block diagram showing a solid image taking apparatus in accordance with the fourth embodiment of the present invention. Elements analogous to those in the first embodiment are given the same reference numerals and, the detailed description thereof is abbreviated, here. Instead of the display changing portion 19 in the first embodiment, the solid image taking system 1A of the fourth embodiment is provided with an alarm portion 20.

Figure 13:
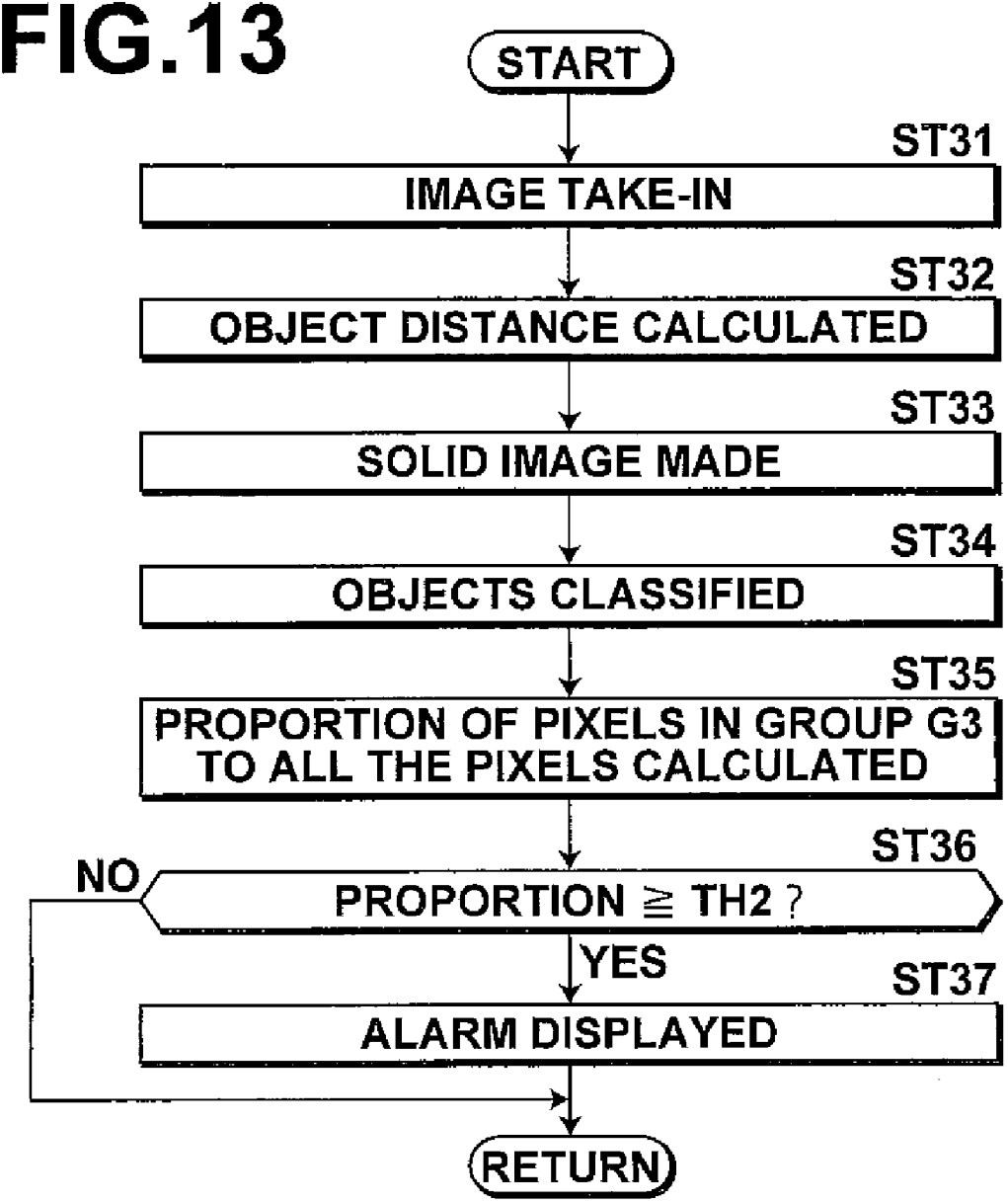
FIG. 13 is a flowchart showing processing executed in the fourth embodiment.

Processing executed in the fourth embodiment will be described, hereinbelow. FIG. 13 is a flowchart showing processing executed in the fourth embodiment. When the power source of the solid image taking system 1A is turned on, the overall control portion 17 is started processing, and takes in the RAM 15 images SA and SB which have been obtained by the cameras 2A and 2B through photographing and have been subjected to the A/D conversion and the image processing. (step ST31) Then the distance calculating portion 7 calculates the object distances of the objects included in the images SA and SB (step ST32) and the solid image making portion 8 makes a solid image (step ST33).

Then the classifying portion 18 classifies the objects included in the images SA and SB into the three groups on the basis of the object distances by pixels included in the images SA and SB calculated by the distance calculating portion 7. (step ST34) Thereafter, the alarm portion 20 calculates the proportion of pixels to be classified into the group G3 in all the pixels in the solid image SR (step ST35) and it is determined whether the calculated proportion is not smaller than a threshold value Th2 (e.g., 30%) (step ST36). When step ST36 is affirmed, the solid image SR is displayed on the monitor 10 together with alarms on the displayed solid image SR (step ST37), and then processing is returned to step ST31. When step ST36 is denied, processing is returned to step ST31.

Figure 14:
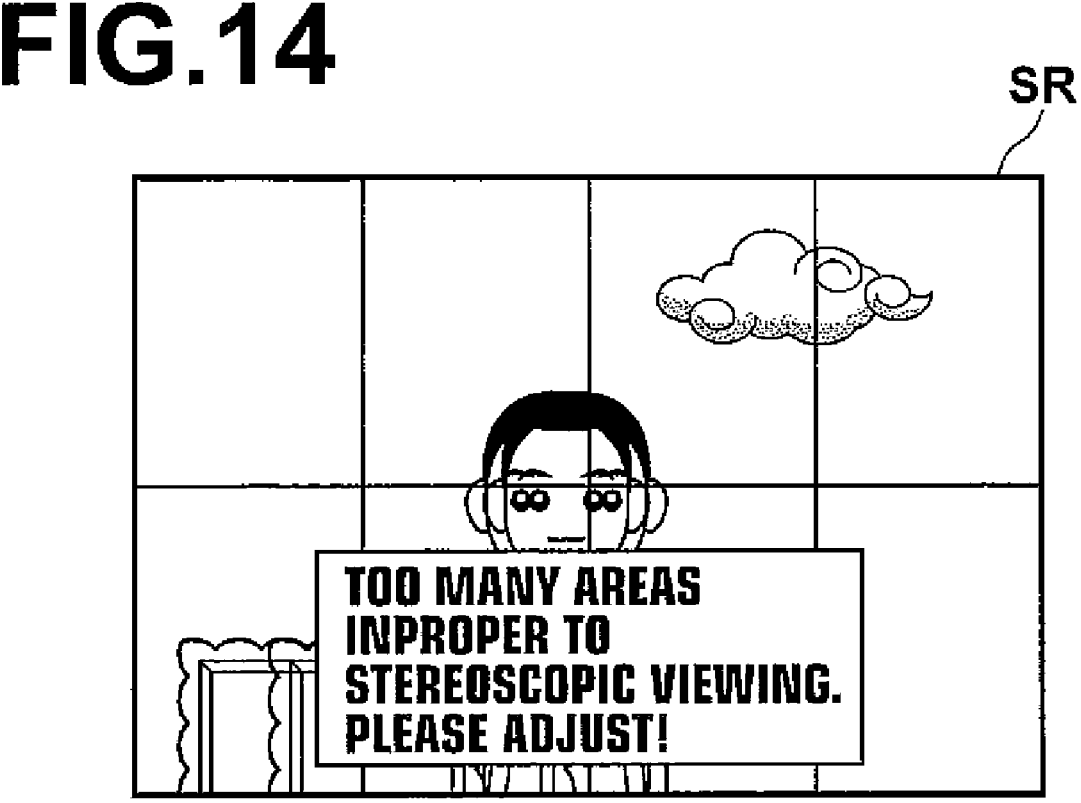
FIG. 14 is a view for description of an example of the alarm.

FIG. 14 is a view for description of an example of the alarm. As shown in FIG. 14, when step ST36 is affirmed, an alarm 30 "Too many areas improper to stereoscopic viewing. Please adjust!" is overlapped with the solid image SR.

In the fourth embodiment, when the proportion of pixels which are at the object distance of the group G3 in the solid image SR is not smaller than a threshold value Th2, the alarm 30 is thus made. Accordingly, by viewing the solid image SR, the photographer can easily know that an object at an undesirable object distance is included in the images SA and SB obtained by the image takings. Accordingly, when the alarm 30 is made, the base length and/or the angle of vergence of the cameras 2A and 2B can be adjusted, whereby an image solely including objects at a desirable object distance can be obtained and, as a result, a solid image free from feeling of fatigue can be made.

Though, in the fourth embodiment, the photographing is continued even after making the alarm 30, the photographing may be stopped after making the alarm 30. With this arrangement, that a solid image which is large in feeling of fatigue can be recorded on the recording medium 12 and the recording medium 12 is consumed in vain can be prevented.

Figure 15:
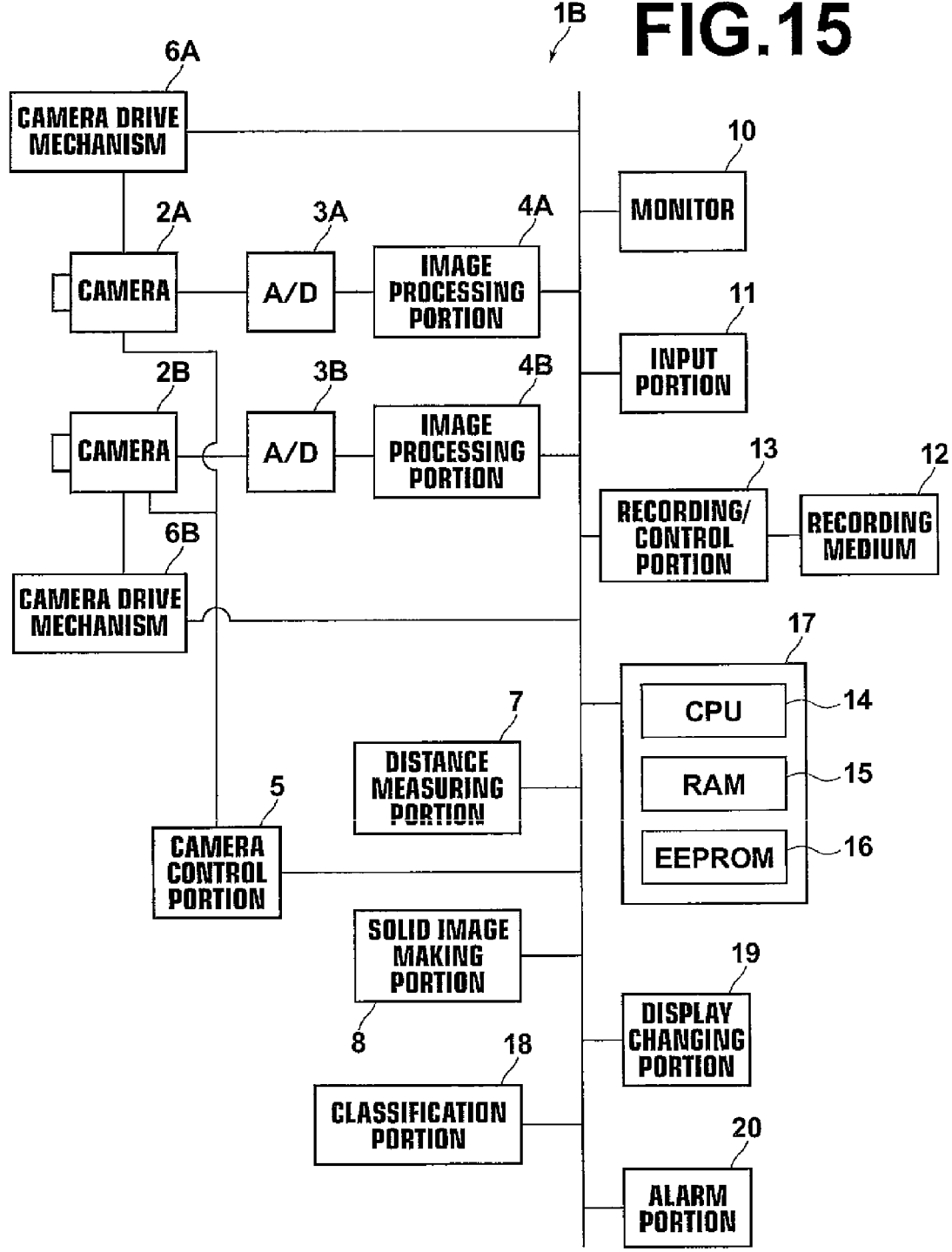
FIG. 15 is a block diagram showing a solid image taking apparatus in accordance with a fifth embodiment of the present invention.

A fifth embodiment of the present invention will be described, hereinbelow. FIG. 15 is a block diagram showing a solid image taking apparatus in accordance with the fifth embodiment of the present invention. Elements analogous to those in the first embodiment are given the same reference numerals and, the detailed description thereof is abbreviated, here. In addition to the solid image taking system 1 in the first embodiment, the solid image taking system 1B of the fifth embodiment is further provided with an alarm portion 20.

Figure 16:
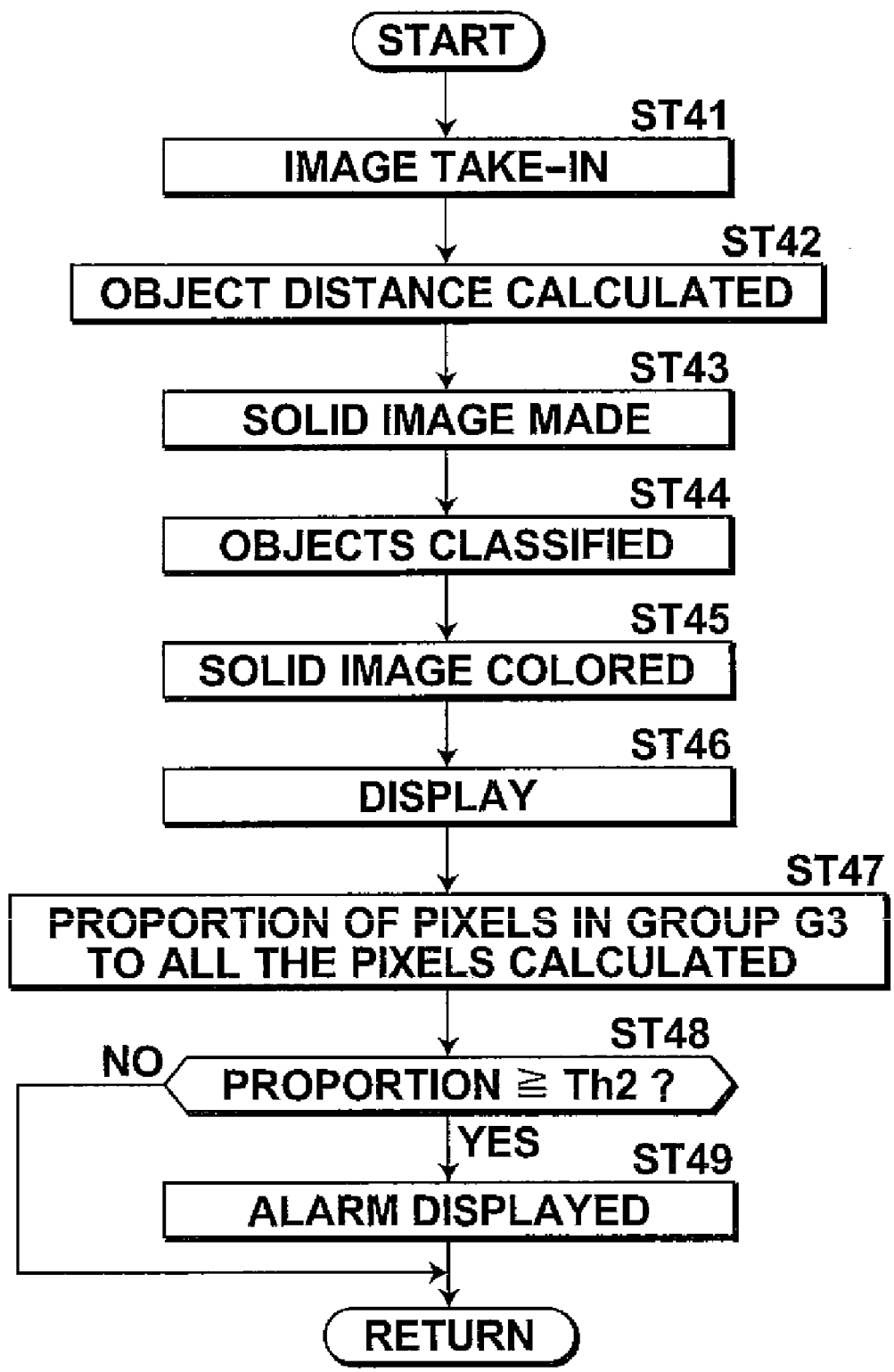
FIG. 16 is a flowchart showing processing executed in the fifth embodiment.

Processing executed in the fifth embodiment will be described, hereinbelow. FIG. 16 is a flowchart showing processing executed in the fifth embodiment. When the power source of the solid image taking system 1A is turned on, the overall control portion 17 is started processing, and takes in the RAM 15 images SA and SB which have been obtained by the cameras 2A and 2B through photographing and have been subjected to the A/D conversion and the image processing. (step ST41) Then the distance calculating portion 7 calculates the object distances of the objects included in the images SA and SB (step ST42) and the solid image making portion 8 makes a solid image (step ST43).

Then the classifying portion 18 classifies the objects included in the images SA and SB into the three groups on the basis of the object distances by pixels included in the images SA and SB calculated by the distance calculating portion 7. (step ST44) Thereafter, the display changing portion 19 divides the solid image SR into a predetermined number of colors (step ST45), the colored solid image SR is displayed on the monitor 10 together with the images SA and SB (step ST46).

Thereafter, the alarm portion 20 calculates the proportion of pixels to be classified into the group G3 in all the pixels in the solid image SR (step ST47) and it is determined whether the calculated proportion is not smaller than a threshold value Th2 (e.g., 30%) (step ST48). When step ST48 is affirmed, the alarm portion 20 makes an alarm on the displayed solid image SR (step ST49), and then processing is returned to step ST41. When step ST48 is denied, processing is returned to step ST41.

In the fifth embodiment, since the alarm 30 is thus made, and at the same time, the objects included in the solid image SR are divided into a predetermined number of colors, the photographer can easily know by viewing the displayed solid image SR the object distance of the objects to be taken, and at the same time, can easily determine whether an object at an undesirable object distance is included in the images SA and SB to be taken. Accordingly, when the alarm 30 is made, the base length and/or the angle of vergence of the cameras 2A and 2B can be adjusted, whereby an image solely including objects at a desirable object distance can be obtained and, as a result, a solid image SR free from feeling of fatigue can be made.

Though in the fifth embodiment, the display changing portion 19 colors in different colors according to the object distances as in the first embodiment, the masking may be effected as in the second embodiment, and area including pixels classified into the group G3 in the solid image may be substituted for the corresponding area in the image SA or SB as in the third embodiment.

Figure 17:
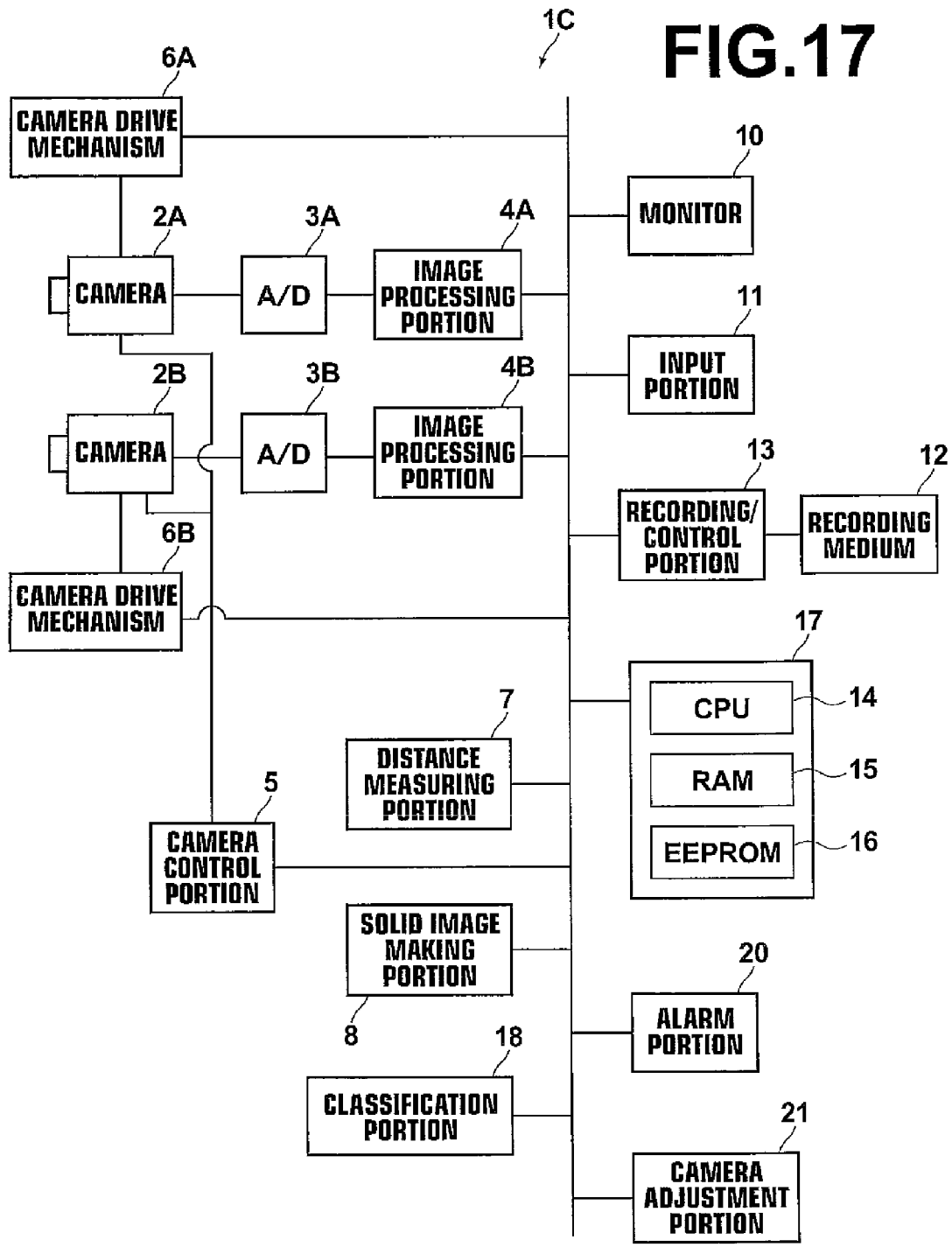
FIG. 17 is a block diagram showing a solid image taking apparatus in accordance with a sixth embodiment of the present invention.

A sixth embodiment of the present invention will be described, hereinbelow. FIG. 17 is a block diagram showing a solid image taking apparatus in accordance with the sixth embodiment of the present invention. Elements analogous to those in the first embodiment are given the same reference numerals and, the detailed description thereof is abbreviated, here. Instead of the display changing portion 19 in the first embodiment, the solid image taking system IC of the sixth embodiment is further provided with an alarm portion 20 and a camera adjustment portion 21.

The camera adjustment portion 21 issues instruction of changing the angle of vergence to the camera drive mechanisms 6A and 6B so that the parallax of the images SA and SB is not smaller than a predetermined threshold value Th3 when the proportion of pixels to be classified into the group G3 in all the pixels in the solid image SR is not smaller than a threshold value Th2 (e.g., 30%).

Figure 18:
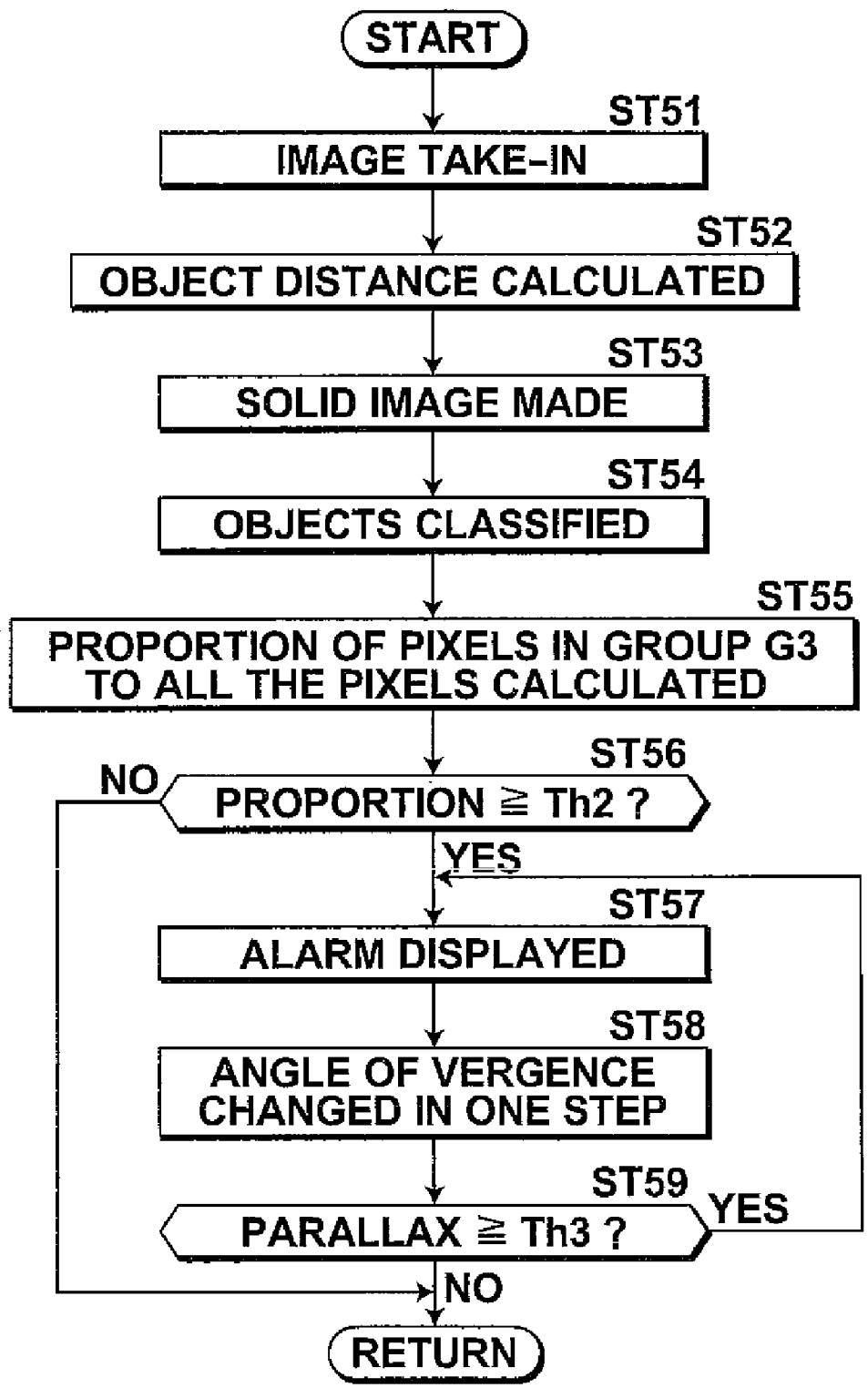
FIG. 18 is a flowchart showing processing executed in the sixth embodiment.

Processing executed in the fifth embodiment will be described, hereinbelow. FIG. 18 is a flowchart showing processing executed in the sixth embodiment. When the power source of the solid image taking system 1C is turned on, the overall control portion 17 is started processing, and takes in the RAM 15 images SA and SB which have been obtained by the cameras 2A and 2B through photographing and have been subjected to the A/D conversion and the image processing. (step ST51) Then the distance calculating portion 7 calculates the object distances of the objects included in the images SA and SB (step ST52) and the solid image making portion 8 makes a solid image (step ST53).

Then the classifying portion 18 classifies the objects included in the images SA and SB into the three groups on the basis of the object distances by pixels included in the images SA and SB calculated by the distance calculating portion 7. (step ST54) Thereafter, the alarm portion 20 calculates the proportion of pixels to he classified into the group G3 in all the pixels in the solid image SR (step ST55) and it is determined whether the calculated proportion is not smaller than a threshold value Th2 (e.g., 30%) (step ST56). When step ST56 is denied, processing is returned to step ST51.

When step ST56 is affirmed, a solid image SR is displayed on the monitor 10 and at the same time, the alarm portion 20 makes an alarm on the displayed solid image SR (step ST57) while the camera adjustment portion 21 issues instruction of changing the angle of vergence in one step to the camera drive mechanisms 6A and 6B (step ST58).

Then the solid image making portion 8 determines whether the parallax for pixels classified into the group G3 is not smaller than the threshold value Th3. (step ST59) When step ST59 is denied, processing is returned to step ST51. When step ST59 is affirmed, processing is returned to step ST57 and steps ST57 to ST59 are repeated.

Figure 19:
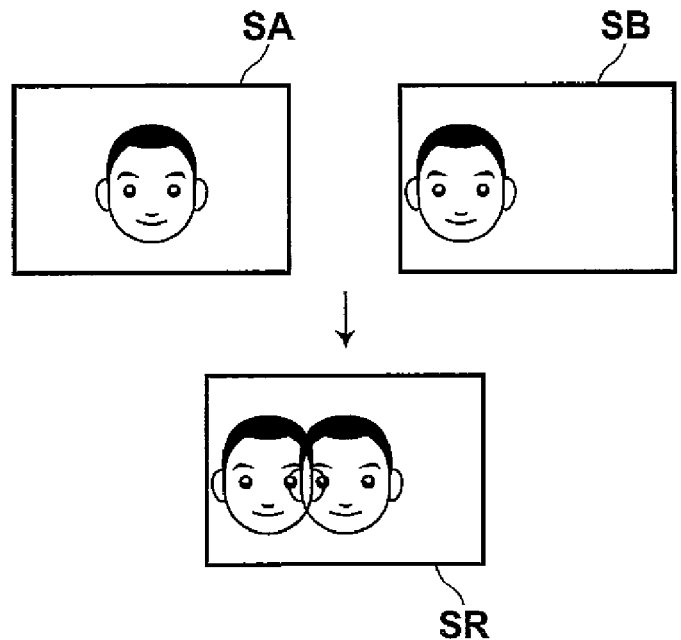
FIG. 19 is a view for description of an example of the change of the angle of vergence.
Figure 20:
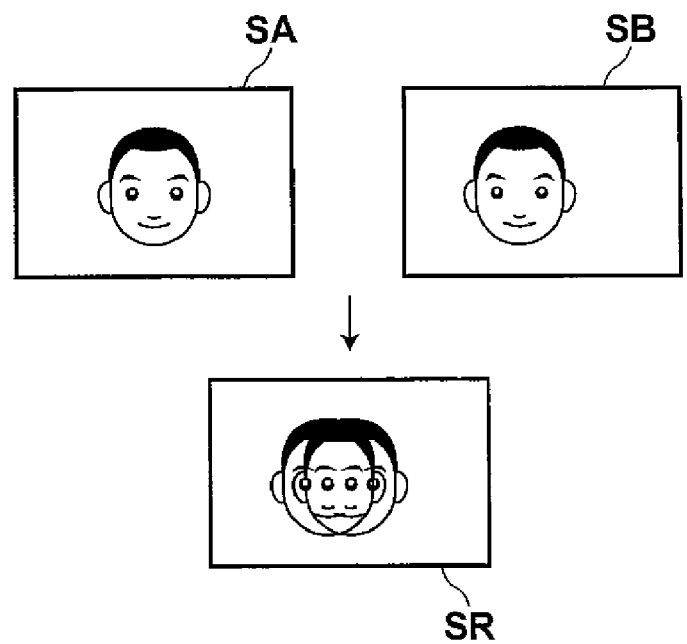
FIG. 20 is a view for description of another example of the change of the angle of vergence.

FIG. 19 is a view for description of an example of the change of the angle of vergence. As shown in FIG. 19, when the parallax of the images SA and SB is too large, the effort of forcing to effect stereoscopic viewing results in much feeling of fatigue in eyes due to a large difference in position of the objects on the solid image SR. This is because difference in angle of photographing field of the images SA and SB is large. Accordingly, the parallax is also reduced by changing as in the sixth embodiment to reduce the difference in angle of photographing field. When the difference in angle of photographing field is reduced, the difference in position of the objects on the solid image SR can be reduced as shown in FIG. 20. Accordingly, stereoscopic viewing can be easily effected and as a result, a solid image SR free from feeling of fatigue can be made.

Figure 21:
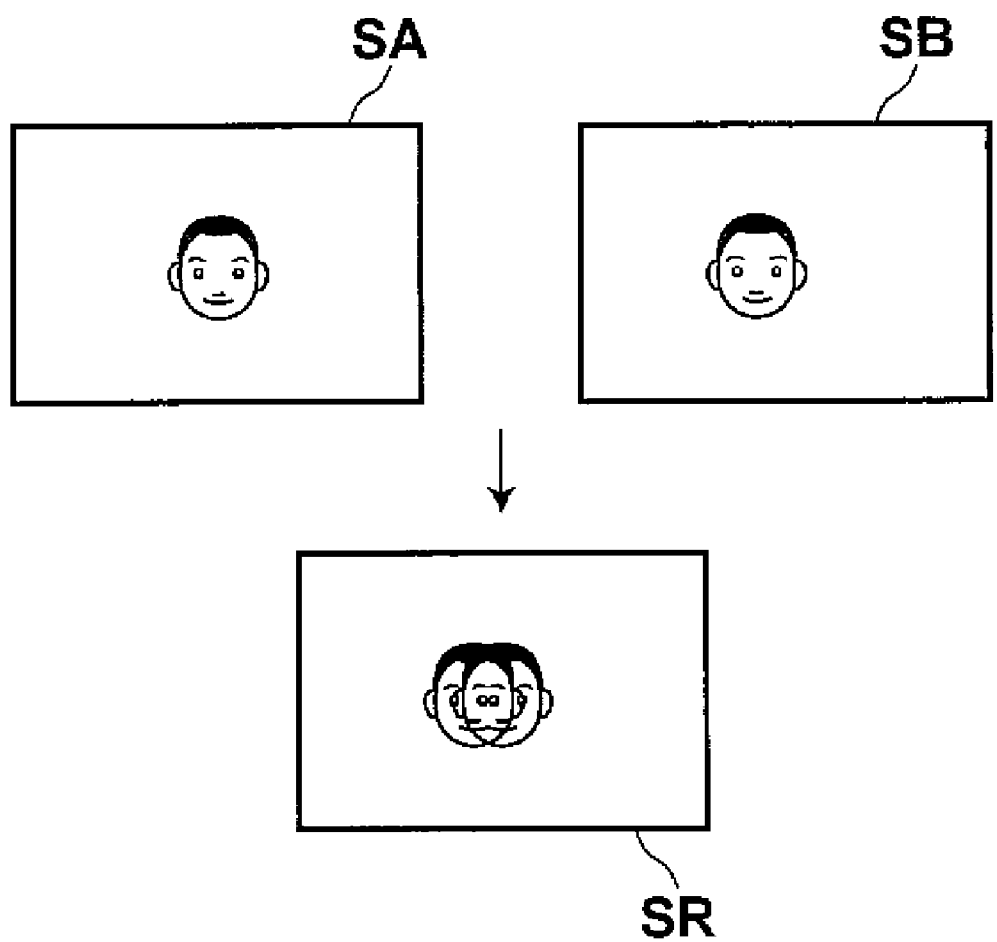
FIG. 21 is a view for description of the change of the zooming magnification.

Though in the sixth embodiment, the angle of vergence of the cameras 2A and 2B is changed, the base length may also be changed. Further, the difference in position of the objects on the solid image SR can also be reduced by reducing the zooming magnification of the cameras 2A and 2B as shown in FIG. 21.

Though in the sixth embodiment, the alarm portion 20 is provided and the angle of vergence of the cameras 2A and 2B is changed after making an alarm, the alarm portion 20 may be abbreviated to change the angle of vergence of the cameras 2A and 2B without alarm.

Though in the fourth to sixth embodiments, the alarm portion 20 displays the alarm 30, the alarm portion 20 may acoustically display the alarm 30. Further, the alarm portion 20 may simultaneously effect both the acoustic display of the alarm 30 and the optical display of the same.

Figure 22:
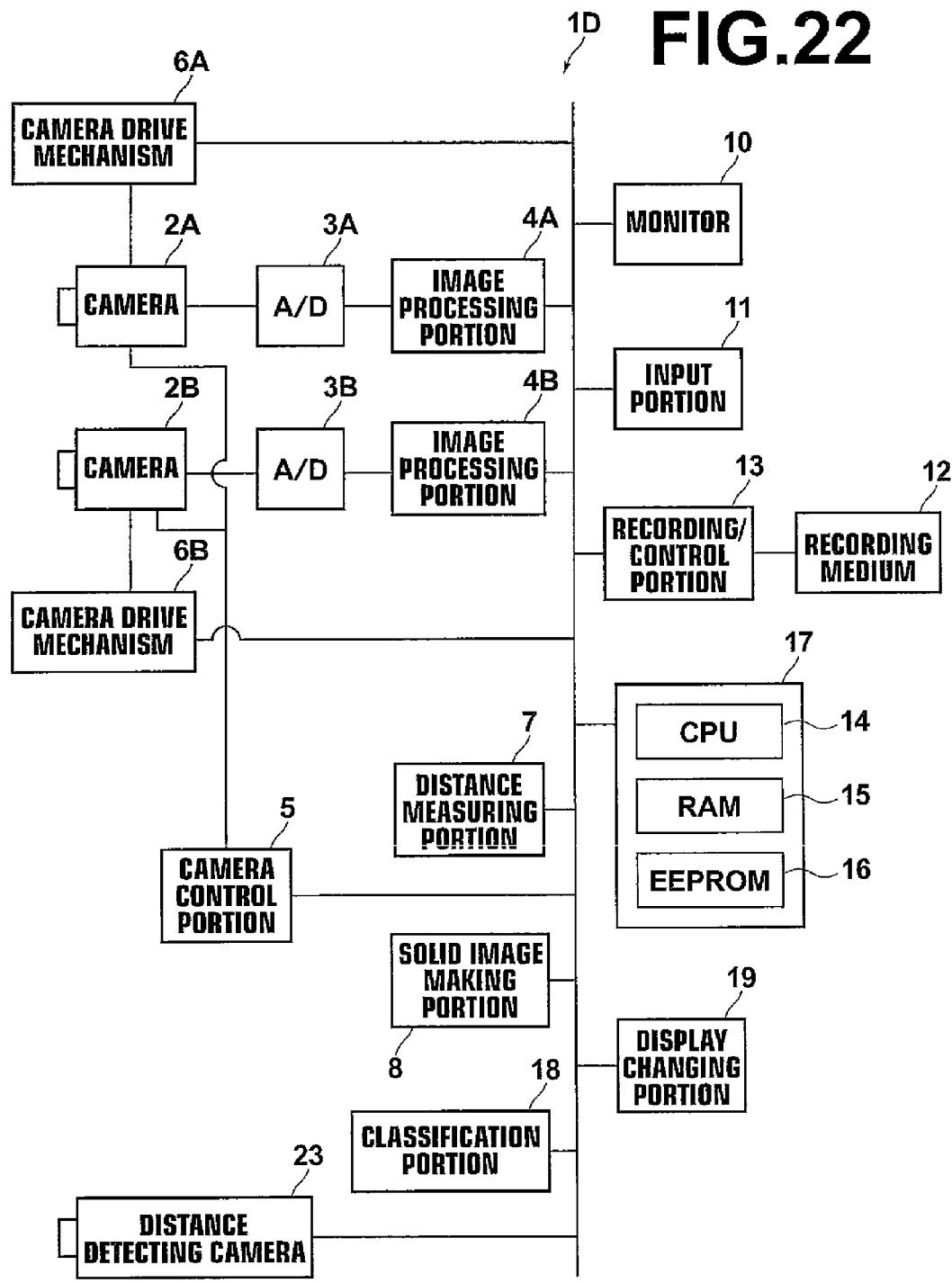
FIG. 22 is a block diagram showing a solid image taking apparatus in accordance with a seventh embodiment of the present invention.

A seventh embodiment of the present invention will be described, hereinbelow. FIG. 22 is a block diagram showing a solid image taking apparatus in accordance with the seventh embodiment of the present invention. Elements analogous to those in the first embodiment are given the same reference numerals and, the detailed description thereof is abbreviated, here. The solid image taking system D of the seventh embodiment is provided with a distance detecting camera 23 and classifies the objects by the use of the object distances detected by the distance detecting camera 23 instead of those calculated by the distance calculating portion 7.

The distance detecting camera 23 is a camera of a TOF (time of flight) system where the distance to the objects from the cameras 2A and 2B is measured by measuring the time required by distance measuring light such as near infrared rays ejected toward the object to return after reflected by the object. The distance detecting camera 23 may be a camera where it detects a focus position of the object (where it is in focus) and the object distance is calculated on the basis of the focus position.

Also by calculating the object distance by the use of the distance detecting camera 23 in this manner, the objects can he classified according to the object distance.

What is claimed is:

1. A solid image taking apparatus comprising:
    a plurality of image taking units which obtain a plurality of images at each sight point by taking a plurality of images of objects from different sight points;
    a distance measuring unit which measures object distances which are distances to the objects from the plurality of image taking units;
    a classifying unit which classifies the objects included in the images into a plurality of groups according to the object distances and outputs the result of classification;
    a display unit which displays a solid image made from the plurality of images; and
    a display form changing unit which changes the display form of the object included in the solid image according to the result of classification;
    wherein the display form changing unit comprises a unit for substituting an image in a corresponding area included in one of the plurality of images for the area at a predetermined object distance included in the solid image.

2. A solid image taking apparatus as defined in claim 1 further comprising an alarm unit for calculating a proportion of the area occupied by the object at a predetermined object distance included in the solid image according to the result of classification and making an alarm when the proportion is not smaller than a predetermined value.

3. A solid image taking apparatus as defined in claim 1 further comprising an adjustment unit for calculating a proportion of the area occupied by the object at a predetermined object distance included in the solid image according to the result of classification and adjusting at least one of an angle of vergence, base length and a zooming magnification when the proportion is not smaller than a predetermined value.

4. A solid image taking method comprising the steps of
    obtaining a plurality of images at each sight point by taking a plurality of images of objects from different sight points with a plurality of image taking units;
    measuring object distances which are distances to the objects from the plurality of image taking units;
    classifying the objects included in the images into a plurality of groups according to the object distances and outputting the result of classification
    a display unit which displays a solid image made from the plurality of images; and
    a display form changing unit which changes the display form of the object included in the solid image according to the result of classification;
    wherein the display form changing unit comprises a unit for substituting an image in a corresponding area included in one of the plurality of images for the area at a predetermined object distance included in the solid image.

5. A non-transitory computer-readable medium in which is recorded a computer program which causes a computer to execute a solid image taking method comprising the steps of:

obtaining a plurality of images at each sight point by taking a plurality of images of objects from different sight points with a plurality of image taking units;

measuring object distances which are distances to the objects from the plurality of image taking units;

classifying the objects included in the images into a plurality of groups according to the object distances and outputting the result of classification displaying a solid image made from the plurality of images; and changing the display form of the object included in the solid image according to the result of classification;

wherein the display is changed by substituting an image in a corresponding area included in one of the plurality of images for the area at a predetermined object distance included in the solid image.

* * * * *